(12) United States Patent
Yamada et al.

(10) Patent No.: US 7,242,648 B2
(45) Date of Patent: Jul. 10, 2007

(54) TRACKING ERROR SIGNAL GENERATION DEVICE, OPTICAL DISC APPARATUS, TRACKING ERROR SIGNAL GENERATION METHOD AND TRACKING CONTROL METHOD

(75) Inventors: Shin-ichi Yamada, Osaka (JP); Yuuichi Kuze, Osaka (JP); Katsuya Watanabe, Nara (JP); Kenji Kondo, Osaka (JP); Akira Yoshikawa, Nara (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 610 days.

(21) Appl. No.: 10/784,318

(22) Filed: Feb. 20, 2004

(65) Prior Publication Data

US 2004/0213102 A1    Oct. 28, 2004

(30) Foreign Application Priority Data

Apr. 28, 2003   (JP) ............................. 2003-124046

(51) Int. Cl.
*G11B 7/00* (2006.01)
(52) U.S. Cl. ................................................. 369/44.37
(58) Field of Classification Search ............ 369/44.37
See application file for complete search history.

(56) References Cited

U.S. PATENT DOCUMENTS 4,787,076 A * 11/1988 Deguchi et al. ......... 369/44.34
5,828,634 A * 10/1998 Ohno et al. ............. 369/44.26
2003/0090970 A1 * 5/2003 Wantanabe et al. ...... 369/44.37

FOREIGN PATENT DOCUMENTS

JP         61-094246         5/1986

* cited by examiner

*Primary Examiner*—Wayne Young
*Assistant Examiner*—LaTanya Bibbins
(74) *Attorney, Agent, or Firm*—Renner, Otto, Boisselle & Sklar, LLP

(57) ABSTRACT

A tracking error signal generation device includes a splitting and convergence section for splitting an optical beam into a main beam and a sub beam; a two-portion main beam detection section for detecting the main beam; a main beam push-pull signal generation section for generating a main beam push-pull signal; a two-portion sub beam detection section for detecting the sub beam; a sub beam push-pull signal generation section for generating a sub beam push-pull signal; a displacement amount detection section for detecting a displacement amount of the main beam push-pull signal from a reference value based on the main beam push-pull signal and the sub beam push-pull signal; and a tracking error signal generation section for generating a tracking error signal by correcting either the main beam push-pull signal or the sub beam push-pull signal based on the displacement amount.

1 Claim, 12 Drawing Sheets

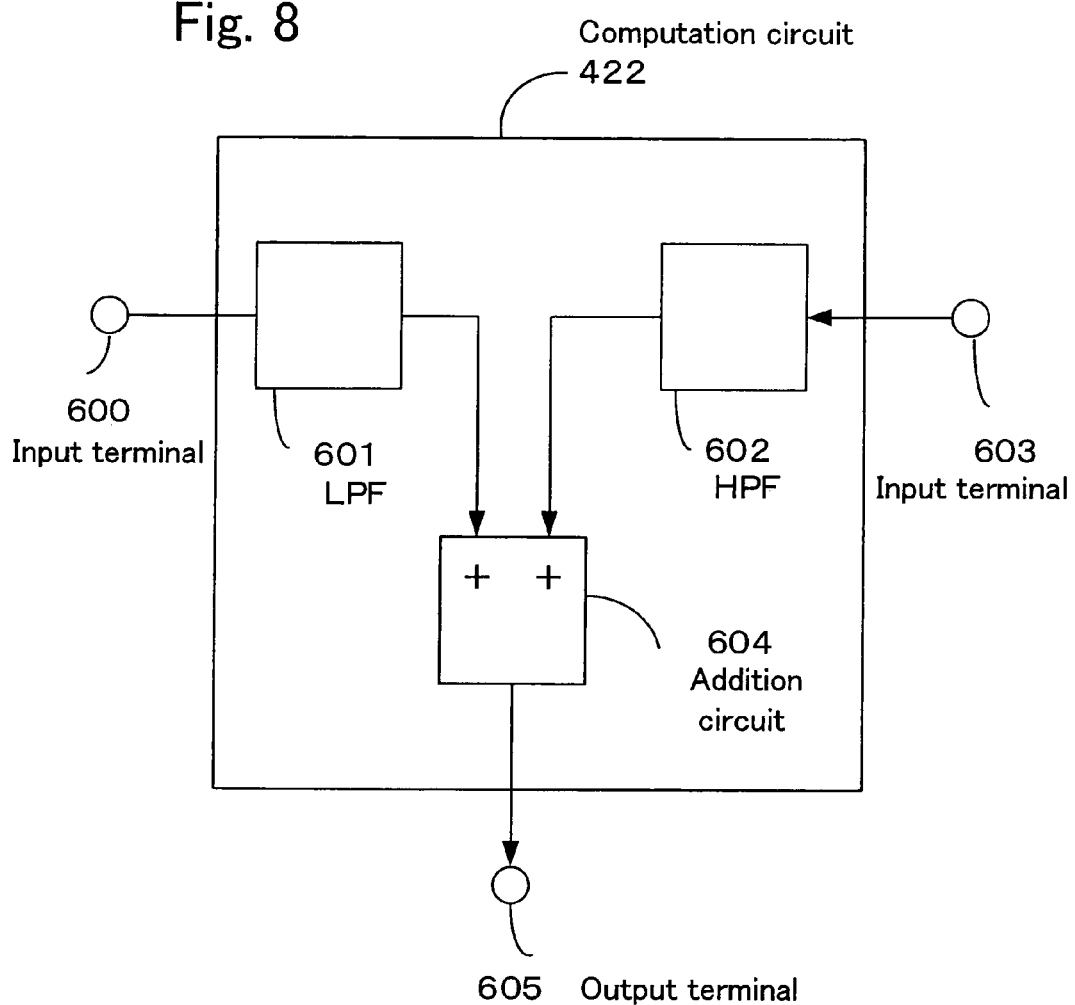

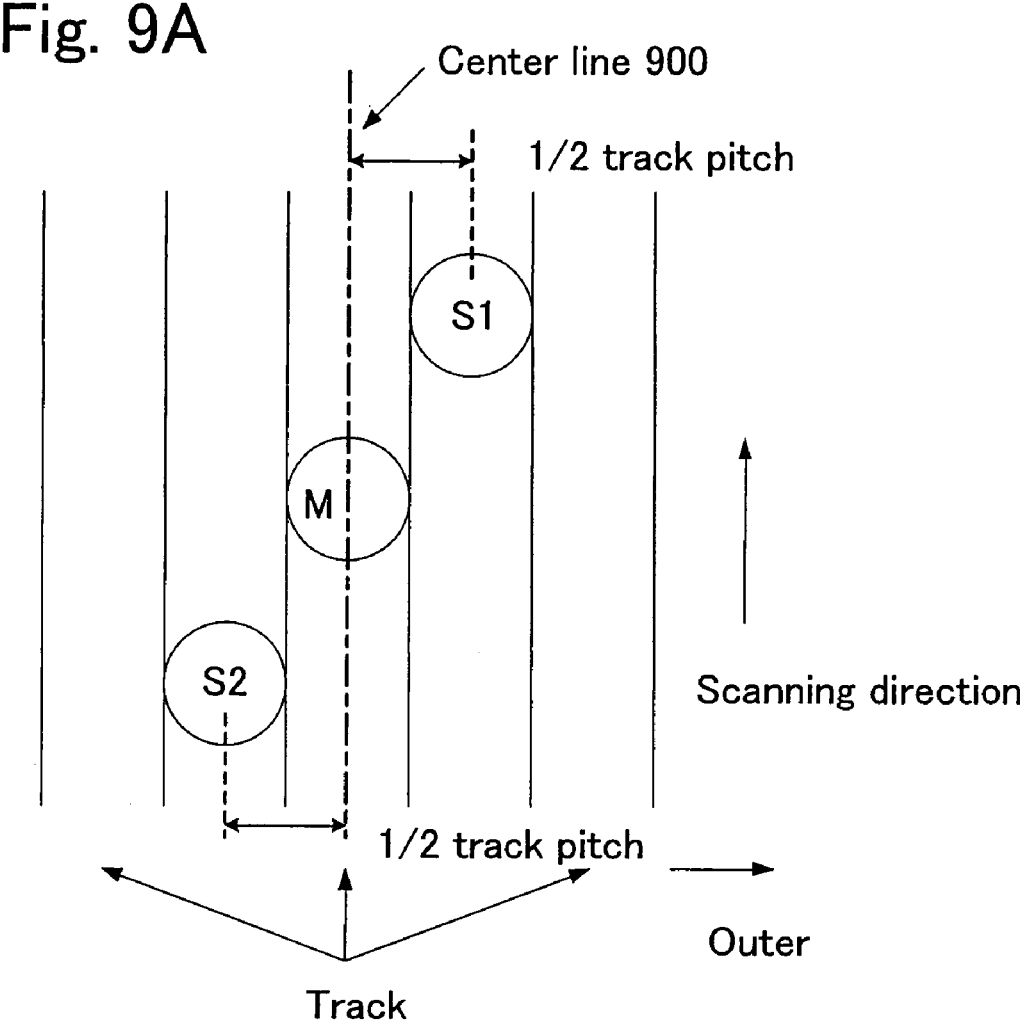

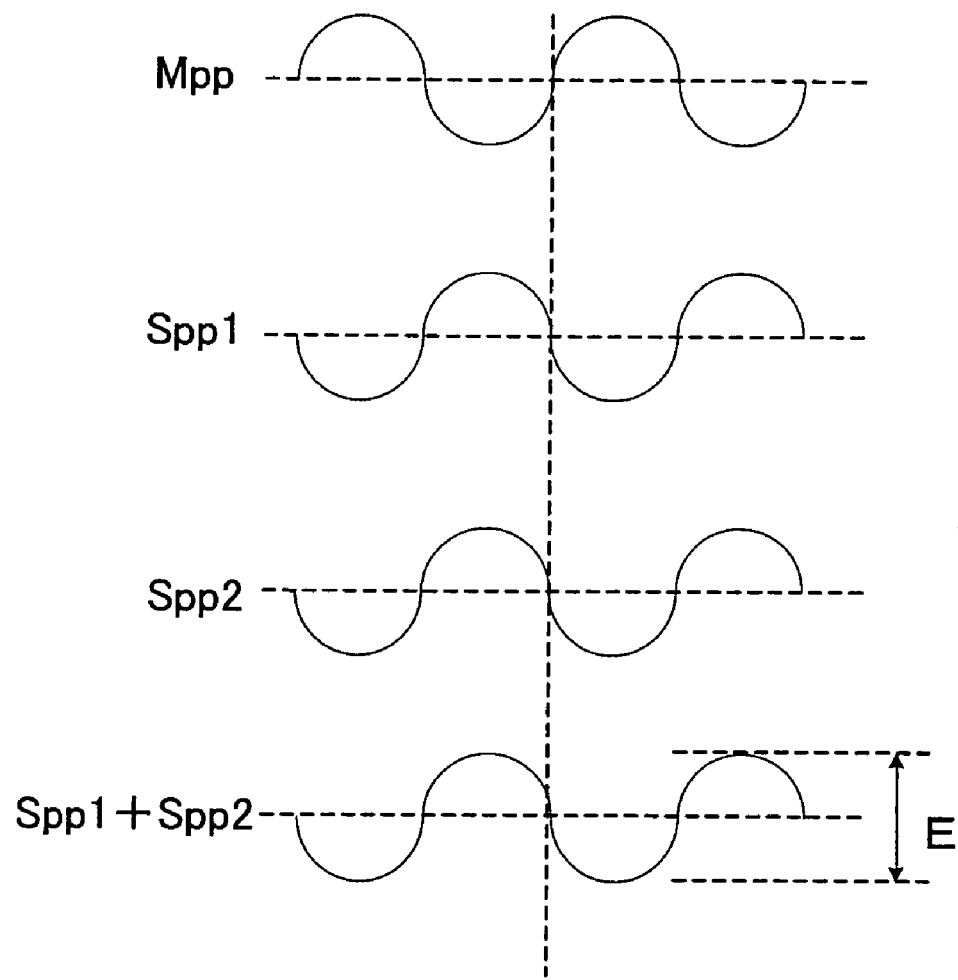

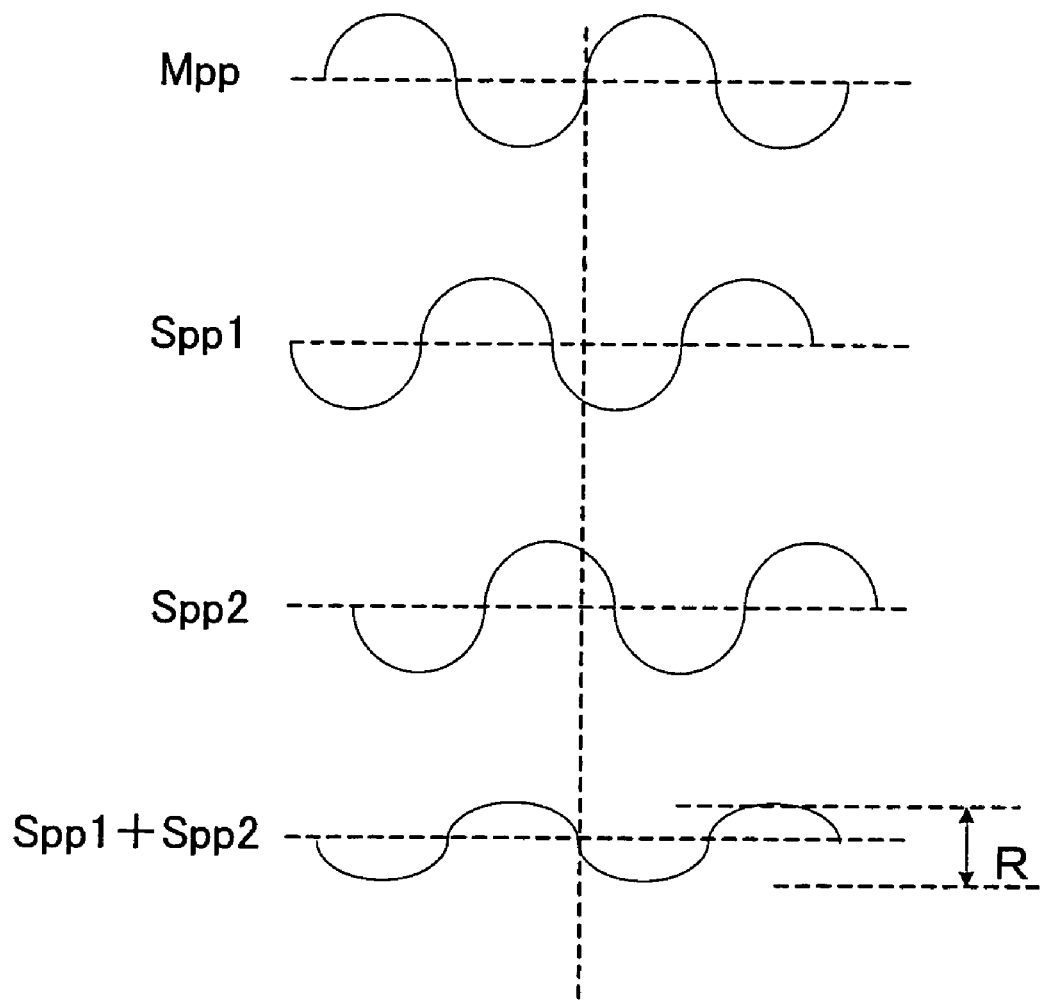

TRACKING ERROR SIGNAL GENERATION DEVICE, OPTICAL DISC APPARATUS, TRACKING ERROR SIGNAL GENERATION METHOD AND TRACKING CONTROL METHOD

This non-provisional application claims priority under 35 U.S.C., §119(a), on Patent Application No. 2003-124046 filed in Japan on Apr. 28, 2003, the entire contents of which are hereby incorporated by reference.

BACKGROUND OF THE INVENTION

1. Field of the Invention

The present invention relates to a tracking error signal generation device, an optical disc apparatus, a tracking error signal generation method, and a tracking control method.

2. Description of the Related Art

It has been conventionally known to use a tracking error signal generation device for generating a tracking error signal in an optical disc apparatus for recording information on or reproducing information from an optical disc. A tracking error signal is a signal for indicating whether or not a beam is moving along a track provided in an optical disc.

A conventional tracking error signal generation device generates a tracking error signal as follows.

An optical beam emitted by a laser is split into a main beam, a first sub beam and a second sub beam by diffraction grating. The main beam, the first sub beam and the second sub beam are converged onto an optical disc by an objective lens. The main beam, the first sub beam and the second sub beam are reflected by the optical disc, and the reflected main beam, first sub beam and second sub beam are detected by a light detector.

In more detail, the light detector includes a two-portion main beam detector, a two-portion first sub beam detector, and a two-portion second sub beam detector. The two-portion main beam detector detects the main beam and generates a differential signal. The two-portion first sub beam detector detects the first sub beam, and generates a differential signal. The two-portion second sub beam detector detects the second sub beam and generates a differential signal.

A main beam push-pull signal generator generates a main beam push-pull signal based on the differential signal generated by the two-portion main beam detector.

A sub beam push-pull signal generator generates a sub beam push-pull signal based on the differential signal generated by the two-portion first sub beam detector and the differential signal generated by the two-portion second sub beam detector. In more detail, the sub beam push-pull signal generator generates a sub beam push-pull signal by adding the differential signal generated by the two-portion first sub beam detector and the differential signal generated by the two-portion second sub beam detector.

Next, the sub beam push-pull signal is amplified at an appropriate gain ratio as necessary, and the amplified sub beam push-pull signal is subtracted from the main beam push-pull signal. Thus, a tracking error signal is generated.

The conventional tracking error signal generation device generates a tracking error signal in this manner. Accordingly, even if the objective lens is displaced and thus the main beam push-pull signal and the sub beam push-pull signal each obtain a DC offset, the DC offset is deleted from the tracking error signal by subtracting the sub beam push-pull signal from the main beam push-pull signal as disclosed in, for example, Japanese Laid-Open Publication No. 61-94246.

However, the amplitude of the tracking error signal may undesirably fluctuate.

For example, when an optical disc is eccentrically provided, the amplitude of the tracking error signal is reduced. When the objective lens is displaced, the main beam push-pull signal is also displaced from the reference value.

Hereinafter, the case where the optical disc is eccentrically provided will be described.

An optical disc, which is rotated by a spindle motor, has a hole at the center thereof to which the spindle motor is attached. The hole is provided such that the center of the hole matches the center of the optical disc, namely, the center of a plurality of tracks formed spirally or concentrically.

However, the center of the optical disc may be undesirably deviated from the center of the hole, in which case the optical disc is rotated eccentrically.

Hereinafter, a tracking error signal when the optical disc is rotated normally, i.e., not eccentrically, will be described with reference to FIGS. 9A and 9B. Then, a tracking error signal when the optical disc is rotated eccentrically will be described with reference to FIGS. 10A and 10B.

FIG. 9A shows a schematic view illustrating the relationship between the tracks and the scanning direction of a main beam M, a first sub beam S1 and a second sub beam S2 when the optical disc is rotated normally.

The optical disc has tracks concentrically or spirally formed. The tracks are provided such that adjacent tracks are parallel to each other.

As shown in FIG. 9A, the distance between the center of the optical spot formed of the first sub beam S1 and the center of the optical spot formed of the main beam M is ½ of the track pitch. Similarly, the distance between the optical spot formed of the center of the second sub beam S2 and the center of the optical spot formed of the main beam M is ½ of the track pitch.

The first sub beam S1 is directed to a position at the center between the track irradiated by the main beam M and a track which is adjacent and outer to the track.

The second sub beam S2 is directed to a position at the center between the track irradiated by the main beam M and a track which is adjacent and inner to the track.

A center line 900 represents the direction in which the main beam M scans the optical disc. In FIG. 9A, the center line 900 and the tracks are parallel to each other.

FIG. 9B is a waveform diagram illustrating the main beam push-pull signal and the sub beam push-pull signal as the main beam M moves along the tracks in the case where the optical disc is rotated normally.

In FIG. 9B, "Mpp" refers both to a main beam push-pull signal based on the main beam M and an amplitude thereof, "Spp1" refers both to a differential signal generated by the two-portion first sub beam detector and an amplitude thereof, and "Spp2" refers both to a differential signal generated by the two-portion second sub beam detector and an amplitude thereof. Spp1+Spp2 is the sub beam push-pull signal. The horizontal axis represents the position of the main beam M.

A tracking error signal TE is obtained by the following expression.

$$TE = Mpp - K \times (Spp1 + Spp2)$$

where K is a prescribed constant.

When the optical disc is rotated normally, the phase of the differential signal Spp1 generated by the two-portion first sub beam detector is the same as the phase of the differential signal Spp2 generated by the two-portion second sub beam detector. The two signals are not deviated in phase from each other. In this state, the sub beam push-pull signal, i.e., Spp1+Spp2, has an amplitude of E.

The tracking error signal is generated by multiplying the sub beam push-pull signal by the prescribed constant K and then subtracting the multiplication result from the main beam push-pull signal.

Next, with reference to FIGS. 10A and 10B, a tracking error signal when the optical disc is rotated eccentrically will be described.

FIG. 10A shows a schematic view illustrating the relationship between the tracks and the scanning direction of the main beam M, the first sub beam S1 and the second sub beam S2 when the optical disc is rotated eccentrically.

As shown in FIG. 10A, when the optical disc is rotated eccentrically, the first sub beam S1 is deviated from the center between the track irradiated by the main beam M and the track which is adjacent and outer to the track in accordance with the rotating angle of the optical disc. Similarly, the second sub beam S2 is deviated from the center between the track irradiated by the main beam M and the track which is adjacent and inner to the track in accordance with the rotating angle of the optical disc.

In FIG. 10A, a center line 1000 is not parallel to the tracks, and a portion of the first sub beam S1 and a portion of the second sub beam S2 are directed to a track 1001.

FIG. 10B is a waveform diagram illustrating the main beam push-pull signal and the sub beam push-pull signal in the case where the optical disc is rotated eccentrically.

In FIG. 10B, Mpp" refers both to a main beam push-pull signal based on the main beam M and an amplitude thereof, "Spp1" refers both to a differential signal generated by the two-portion first sub beam detector and an amplitude thereof, and "Spp2" refers both to a differential signal generated by the two-portion second sub beam detector and an amplitude thereof. Spp1+Spp2 is the sub beam push-pull signal. The horizontal axis represents the position of the main beam M.

In the case where a portion of the first sub beam S1 and a portion of the second sub beam S2 are directed to a track 1001 as shown in FIG. 10A, the phase of the differential signal Spp1 is deviated with respect to the phase of the differential signal Spp2 as shown in FIG. 10B.

Here also, a tracking error signal TE is obtained by the following expression.

$$TE = Mpp - K \times (Spp1 + Spp2),$$

where K is a prescribed constant.

When the optical disc is rotated eccentrically, the phase of the differential signal Spp1 is deviated with respect to the phase of the differential signal Spp2. Accordingly, where the amplitude of the sub beam push-pull signal, i.e., Spp1+Spp2, is R, the amplitude R is smaller than the amplitude E of the sub beam push-pull signal described-above with reference to FIG. 9B.

As described above, a tracking error signal is generated by multiplying the sub beam push-pull signal by the prescribed constant K and then subtracting the multiplication result from the main beam push-pull signal. Therefore, when the amplitude of the sub beam push-pull signal is smaller, an appropriate tracking error signal cannot be generated.

When the amplitude of the sub beam push-pull signal is reduced, the open loop gain of the tracking control system is reduced, which makes the tracking control system unstable.

The conventional tracking error signal generation device has the following problem in addition to the problem that the amplitude of the tracking error signal fluctuates.

Recently, it has been desired to increase the memory capacity of optical discs. In order to meet this desire, it has been proposed to provide an optical disc with a plurality of information faces. In such an optical disc, information can be recorded on or reproduced from the plurality of information faces by directing an optical beam from a prescribed direction.

When the information recorded on a prescribed information face is reproduced, focusing control is performed such that the optical beam is converged onto the prescribed information face. Tracking control is performed such that the optical beam moves along the tracks of the prescribed information face.

While the information recorded on the prescribed information face is reproduced, an optical beam passing through the prescribed information face may be undesirably reflected by an information face different from the prescribed information face and is incident on the light detector.

Generally in a tracking error signal generation device, a light amount of a sub beam is about 1/10 of the a light amount of a main beam. A light amount of the sub beam reflected by a prescribed information face is smaller than a light amount of the main beam reflected by the prescribed information face. Therefore, when a main beam passing through the prescribed information face is reflected by an information face different from the prescribed information face and is incident on the light detector, the light amount thereof which is incident on the two-portion first sub beam light detector and the two-portion second sub beam light detector is not negligible.

The light amount of the main beam which is incident on the two-portion first sub beam light detector and the two-portion second sub beam light detector varies in accordance with, for example, the distance between the prescribed information face and the different information face being changed. The distance between a track or portions thereof of the prescribed information face and the corresponding track or portions thereof of the different information face of the optical disc varies. Therefore, while the optical disc is rotating, the light amount of the main beam reflected by the different information face changes by a cycle of several hundred hertz.

A portion of the main beam reflected by the different information face acts as an external disturbance to the sub beam push-pull signal, resulting in the tracking error signal including an offset component. Therefore, the tracking cannot be appropriately controlled, which may undesirably deteriorate the recording and/or reproduction quality.

SUMMARY OF THE INVENTION

According to one aspect of the invention, a tracking error signal generation device includes a splitting and convergence section for splitting an optical beam into a main beam and a sub beam and converging the main beam and the sub beam onto an optical disc; a two-portion main beam detection section for detecting the main beam reflected by the optical disc; a main beam push-pull signal generation section for generating a main beam push-pull signal based on a differential signal which is output from the two-portion main beam detection section; a two-portion sub beam detection section for detecting the sub beam reflected by the optical disc; a sub beam push-pull signal generation section for generating a sub beam push-pull signal based on a differential signal which is output from the two-portion sub beam detection section; a displacement amount detection section for detecting a displacement amount of the main beam push-pull signal from a reference value based on the main beam push-pull signal and the sub beam push-pull signal; and a tracking error signal generation section for generating a tracking error signal by correcting either the main beam push-pull signal or the sub beam push-pull signal based on the displacement amount detected by the displacement amount detection section.

In one embodiment of the invention, the displacement amount detection section adds the main beam push-pull signal and the sub beam push-pull signal and detects the addition result as a displacement amount of the main beam push-pull signal from the reference value.

In one embodiment of the invention, the tracking error signal generation section generates a tracking error signal by correcting the main beam push-pull signal based on a low frequency component of a signal representing the displacement amount detected by the displacement amount detection section.

In one embodiment of the invention, the optical disc has at least one track. The splitting and convergence section includes an objective lens for converging the main beam and the sub beam onto the optical disc. The tracking error signal generation device further includes a driving section for driving an objective lens displacement section for displacing the objective lens in a direction substantially perpendicular to the at least one track by outputting a driving signal to the objective lens displacement section. The displacement amount detection section includes a first objective lens displacement amount detection section for adding the main beam push-pull signal and the sub beam push-pull signal and detecting the addition result as an objective lens displacement amount, and a second objective lens displacement amount detection section for detecting an objective lens displacement amount based on the driving signal. The tracking error signal generation section generates the tracking error signal by correcting the main beam push-pull signal based on a low frequency component of a signal showing the objective lens displacement amount detected by the first objective lens displacement amount detection section and a high frequency component of a signal showing the objective lens displacement amount detected by the second objective lens displacement amount detection section.

In one embodiment of the invention, the second objective lens displacement amount detection section includes an equivalent filter having a characteristic which is equivalent to a characteristic of the objective lens displacement section and detecting the objective lens displacement amount based on the driving signal.

According to another aspect of the invention, an optical disc apparatus includes a tracking error signal generation device including: a splitting and convergence section for splitting an optical beam into a main beam and a sub beam and converging the main beam and the sub beam onto an optical disc having at least one track, the splitting and convergence section including an objective lens for converging the main beam and the sub beam onto the optical disc, a two-portion main beam detection section for detecting the main beam reflected by the optical disc, a main beam push-pull signal generation section for generating a main beam push-pull signal based on a differential signal which is output from the two-portion main beam detection section, a two-portion sub beam detection section for detecting the sub beam reflected by the optical disc, a sub beam push-pull signal generation section for generating a sub beam push-pull signal based on a differential signal which is output from the two-portion sub beam detection section, a displacement amount detection section for detecting a displacement amount of the main beam push-pull signal from a reference value based on the main beam push-pull signal and the sub beam push-pull signal, and a tracking error signal generation section for generating a tracking error signal by correcting either the main beam push-pull signal or the sub beam push-pull signal based on the displacement amount detected by the displacement amount detection section; an objective lens displacement section for displacing the objective lens in a direction substantially perpendicular to the at least one track; a transfer section for transferring the objective lens displacement section in a direction substantially perpendicular to the at least one track; a transfer control section for controlling the transfer section based on the displacement amount detected by the displacement amount detection section; and a tracking control section for controlling the objective lens displacement section based on the tracking error signal.

In one embodiment of the invention, the tracking error signal generation section further includes a driving section for driving the objective lens displacement section by outputting a driving signal to the objective lens displacement section. The displacement amount detection section includes a first objective lens displacement amount detection section for adding the main beam push-pull signal and the sub beam push-pull signal and detecting the addition result as an objective lens displacement amount, and a second objective lens displacement amount detection section for detecting an objective lens displacement amount based on the driving signal. The tracking error signal generation section generates the tracking error signal by correcting the main beam push-pull signal based on a low frequency component of a signal showing the objective lens displacement amount detected by the first objective lens displacement amount detection section and a high frequency component of a signal showing the objective lens displacement amount detected by the second objective lens displacement amount detection section. The transfer control section controls the transfer section based on the low frequency component and the high frequency component.

According to still another aspect of the invention, a tracking error signal generation method includes the steps of splitting an optical beam into a main beam and a sub beam and converging the main beam and the sub beam onto an optical disc; detecting the main beam reflected by the optical disc by a two-portion main beam detection section; generating a main beam push-pull signal based on a differential signal which is output from the two-portion main beam detection section; detecting the sub beam reflected by the optical disc by a two-portion sub beam detection section; generating a sub beam push-pull signal based on a differential signal which is output from the two-portion sub beam detection section; detecting a displacement amount of the main beam push-pull signal from a reference value based on the main beam push-pull signal and the sub beam push-pull signal by a displacement amount detection section; and generating a tracking error signal by correcting either the main beam push-pull signal or the sub beam push-pull signal based on the displacement amount detected by the displacement amount detection section.

According to still another aspect of the invention, a tracking control method includes the steps of splitting an optical beam into a main beam and a sub beam and converging the main beam and the sub beam onto an optical disc having at least one track by an objective lens; detecting the main beam reflected by the optical disc by a two-portion main beam detection section; generating a main beam push-pull signal based on a differential signal which is output from the two-portion main beam detection section; detecting the sub beam reflected by the optical disc by a two-portion sub beam detection section; generating a sub beam push-pull signal based on a differential signal which is output from the two-portion sub beam detection section; detecting a displacement amount of the main beam push-pull signal from a reference value based on the main beam push-pull signal and the sub beam push-pull signal by a displacement amount detection section; generating a tracking error signal by correcting either the main beam push-pull signal or the sub beam push-pull signal based on the displacement amount detected by the displacement amount detection section; controlling a transfer section for transferring an objective lens displacement section for displacing the objective lens in a direction substantially perpendicular to at least one track based on the displacement amount detected by the displacement amount detection section; and controlling the objective lens displacement section for displacing the objective lens in a direction substantially perpendicular to the at least one track based on the tracking error signal.

As described above, according to a tracking error signal generation device of the present invention, the displacement amount detection section detects a displacement amount of the main beam push-pull signal from the reference value based on the main beam push-pull signal and the sub beam push-pull signal. The tracking error signal generation section generates a tracking error signal by correcting either the main beam push-pull signal or the sub beam push-pull signal based on the displacement amount. Therefore, the tracking error signal can be generated in the state where an offset component caused by displacement of the main beam push-pull signal from the reference value is cancelled.

According to a tracking error signal generation device of the present invention, a tracking error signal is generated by correcting the main beam push-pull signal based on a low frequency component of a signal representing the displacement amount detected by the displacement amount detection section. Therefore, a tracking error signal which has the external disturbance of the sub beam push-pull signal cancelled therefrom is obtained. The external disturbance of the sub beam push-pull signal is caused by the main beam reflected by an information face which is different from the target information face of the optical disc.

According to a tracking error signal generation device of the present invention, the first objective lens displacement amount detection section adds the main beam push-pull signal and the sub beam push-pull signal to detect a displacement amount of the objective lens, and the second objective lens displacement amount detection section detects a displacement amount of the objective lens based on the driving signal for driving the objective lens displacement section. A tracking error signal is generated by correcting the main beam push-pull signal based on a low frequency component of a signal representing the displacement amount detected by the first objective lens displacement amount detection section and a high frequency component of a signal representing the displacement amount detected by the second objective lens displacement amount detection section. Therefore, a tracking error signal which has the external disturbance of the sub beam push-pull signal cancelled and is accurate in a high frequency range is obtained. The external disturbance of the sub beam push-pull signal is caused by the main beam reflected by an information face which is different from the target information face of the optical disc.

A tracking error signal generation device according to the present invention includes an equivalent filter having a characteristic which is equivalent to that of an objective lens displacement section. Therefore, an objective lens displacement amount can be detected based on a driving signal for driving the objective lens displacement section.

An optical disc apparatus according to the present invention includes a transfer section for transferring the objective lens displacement section in a direction substantially perpendicular to the tracks, and a transfer control section for controlling the transfer section based on the output from the objective lens displacement amount detection section. Therefore, the objective lens displacement amount can be reduced.

An optical disc apparatus according to the present invention includes an objective lens displacement section for displacing the objective lens in a direction substantially perpendicular to the tracks, a transfer section for transferring the objective lens displacement section in a direction substantially perpendicular to the tracks, and a transfer control section for controlling the transfer section based on a low frequency component of the output signal from a first objective lens displacement amount detection section and a high frequency component of the output signal from the second objective lens displacement amount detection section. Therefore, the influence of the objective lens displacement amount can be reduced over a broad frequency range.

Thus, the invention described herein makes possible the advantages of providing a tracking error signal generation device and a tracking error signal generation method for generating an appropriate tracking error signal by detecting a displacement amount of a main beam push-pull signal, obtained from a main beam, from a reference value, based on the main beam push-pull signal and a sub beam push-pull signal obtained from sub beams, and then correcting either the main beam push-pull signal or the sub beam push-pull signal based on the displacement amount; an optical disc apparatus including such a tracking error signal generation device; and a tracking control method for performing tracking control using the tracking error signal generated by such a tracking error signal generation device and method.

These and other advantages of the present invention will become apparent to those skilled in the art upon reading and understanding the following detailed description with reference to the accompanying figures.

BRIEF DESCRIPTION OF THE DRAWINGS

FIG. 8 is a block diagram illustrating a computation circuit in the second example;

FIG. 9A is a schematic diagram showing the relationship between the tracks and the scanning direction of the main beam and the sub beams where the optical disc is rotated normally in a conventional tracking error signal generation device;

FIG. 9B is a waveform diagram illustrating a main beam push-pull signal and a sub beam push-pull signal where the optical disc is rotated normally in the conventional tracking error signal generation device;

FIG. 10B is a waveform diagram illustrating a main beam push-pull signal and a sub beam push-pull signal where the optical disc is rotated eccentrically in the conventional tracking error signal generation device.

DESCRIPTION OF THE PREFERRED EMBODIMENTS

Hereinafter, the present invention will be described by way of illustrative examples with reference to the accompanying drawings.

EXAMPLE 1

Figure 1:
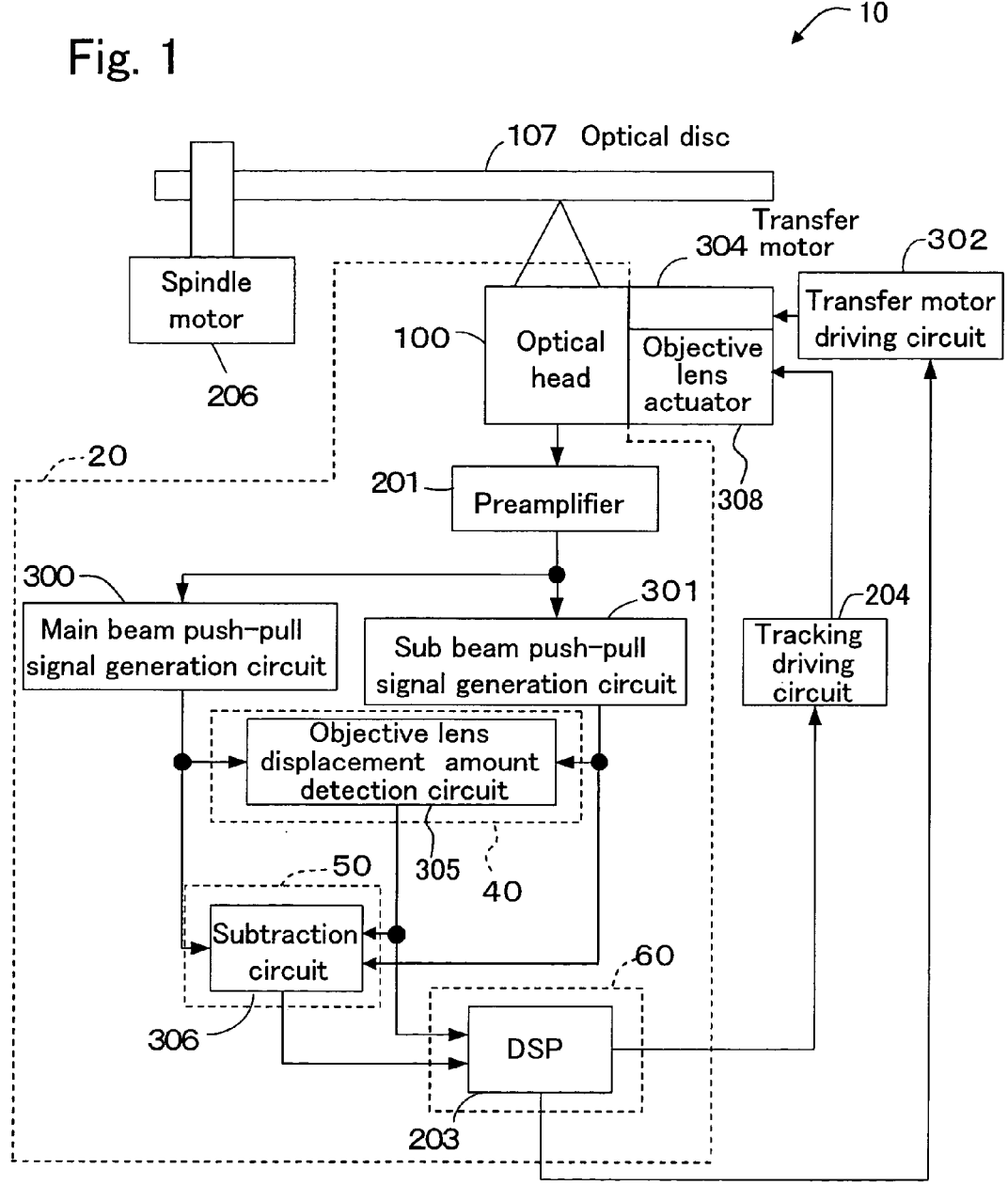
FIG. 1 is a block diagram illustrating an optical disc apparatus including a tracking error signal generation device according to a first example of the present invention.

FIG. 1 is a block diagram illustrating an optical disc apparatus 10 having a tracking error signal generation device 20 according to a first example of the present invention.

The optical disc apparatus 10 includes the tracking error signal generation device 20 for generating a tracking error signal for an optical disc 107, a tracking driving circuit 204, a spindle motor 206 for rotating the optical disc 107 at a prescribed rotation rate, an objective lens actuator 308, and a transfer motor driving circuit 302.

The tracking error signal generation device 20 includes an optical head 100, a main beam push-pull signal generation circuit 300, a sub beam push-pull signal generation circuit 301, a displacement amount detection section 40, and a tracking error signal generation section 50.

The tracking error signal generation device 20 may further include a preamplifier 201 for amplifying a signal which is output from the optical head 100.

The tracking error signal generation device 20 may further include a driving section 60 for driving the tracking driving circuit 204.

The optical disc 107 has at least one information face.

In the case where the optical disc 107 has two or more information faces, the optical head 100 moves a beam spot to a target information face so as to record information on the target information face or reproduce information recorded on the target information face.

Figure 2:
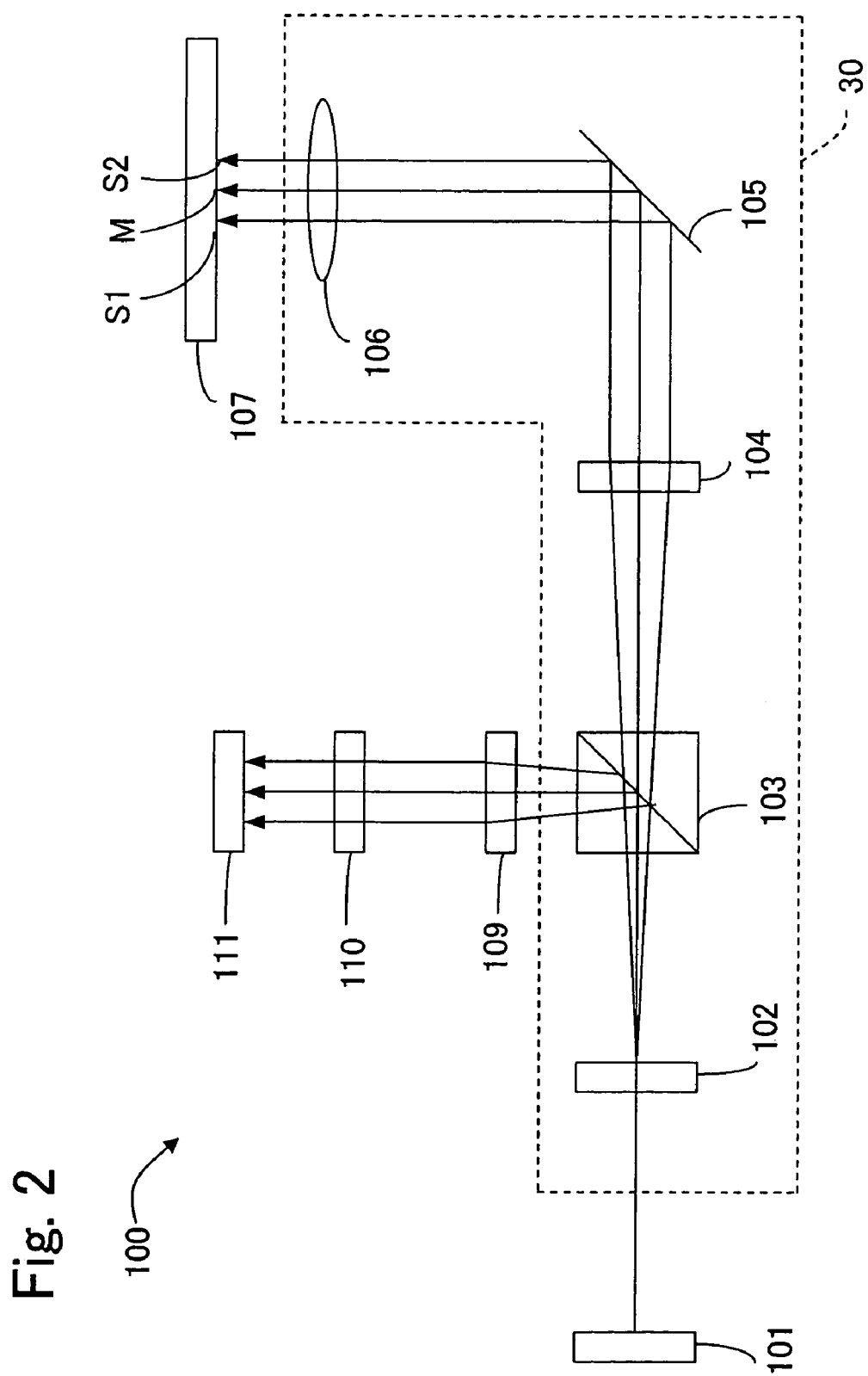
FIG. 2 is a block diagram illustrating an optical head in the tracking error signal generation device in the first example.

With reference to FIG. 2, the optical head 100 of the optical disc apparatus 10 will be described in more detail.

FIG. 2 is a block diagram illustrating the optical head 100 according to the first example of the present invention.

The optical head 100 includes a splitting and conversion section 30 for splitting an optical beam into a main beam and sub beams and converging the main beam and the sub beams onto the optical disc 107, and a light detector 111.

The optical head 100 may further include a hologram device 109 and a cylindrical lens 110.

The splitting and conversion section 30 includes a semiconductor laser 101, a diffraction grating 102, a beam splitter 103, alight collection lens 104, a reflective mirror 105, and an objective lens 106.

An optical beam emitted by the semiconductor laser 101 is split by the diffraction grating 102 into a main beam M corresponding to a zero order light component, a first sub beam S1 corresponding to a plus first order light component, and a second sub beam S2 corresponding to a minus first order light component. The main beam M, the first sub beam S1 and the second sub beam S2 are transmitted through the beam splitter 103.

Next, the main beam M, the first sub beam S1 and the second sub beam S2 are collected to the reflective mirror 105 by the light collection lens 104.

The main beam M, the first sub beam S1 and the second sub beam S2 are reflected by the reflective mirror 105 and then converged onto a prescribed information face of the optical disc 107 by the objective lens 106. In more detail, the main beam M is converged onto a desired track of the optical disc 107 by the objective lens 106. The first sub beam S1 is converged by the objective lens 106 onto a position which is away in an outer direction from the main beam M by a prescribed distance. The second sub beam S2 is converged by the objective lens 106 onto a position which is away in an inner direction from the main beam M by a prescribed distance.

The main beam M, the first sub beam S1 and the second sub beam S2 will be described.

Figure 3:
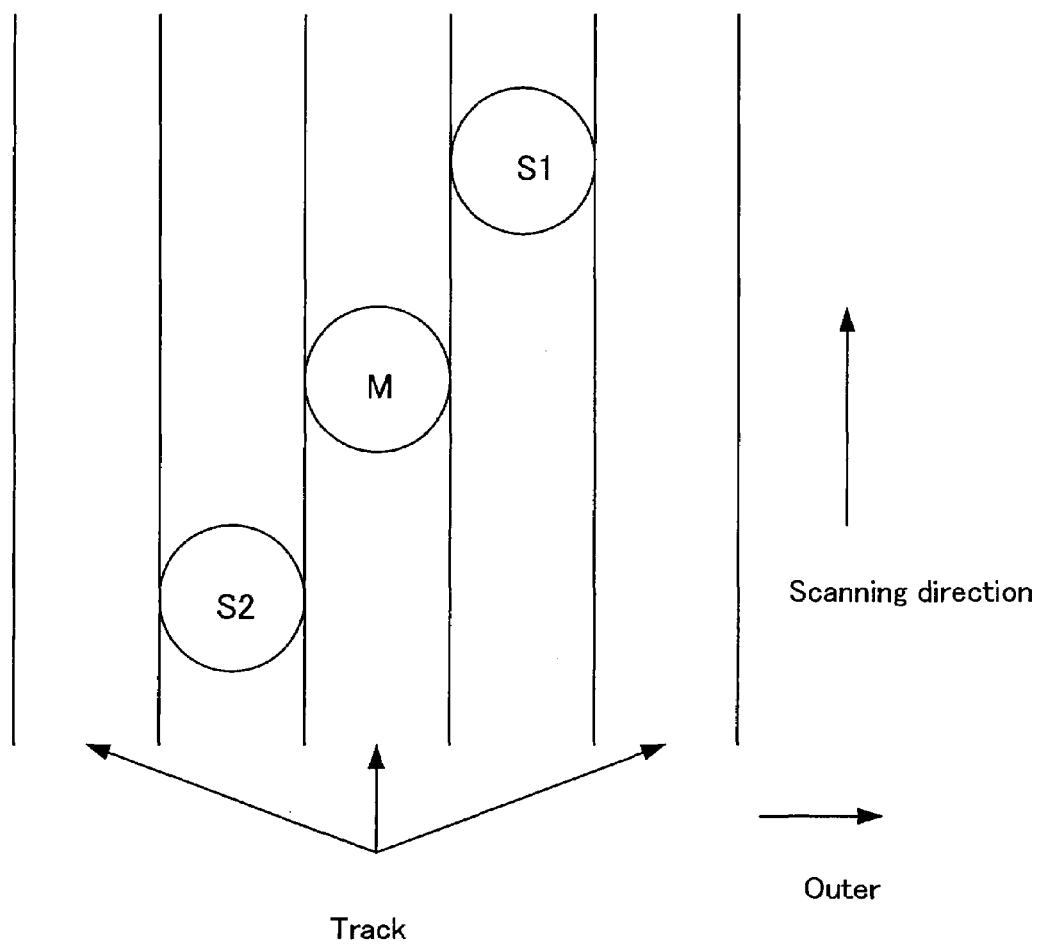
FIG. 3 is a schematic view illustrating the relationship between tracks and optical beams for explaining the first example.

FIG. 3 is a schematic view illustrating the relationship between the tracks of the optical disc 107 and the main beam M, the first sub beam S1 and the second sub beam S2 in the first example.

The first sub beam S1 is directed to a position which is advanced in the scanning direction and deviated in an outer direction by about ½ track pitch with respect to the main beam M. The second sub beam S2 is directed to a position which is behind in the scanning direction and deviated in an inner direction by about ½ track pitch with respect to the main beam M.

The tracks are provided parallel to each other. The main beam M, the first sub beam S1 and the second sub beam S2 move on the optical disc 107 in the scanning direction.

Returning to FIG. 2, the optical disc 100 will be described.

The main beam M, the first sub beam S1 and the second sub beam S2 are reflected by the optical disc 107. The main beam M, the first sub beam S1 and the second sub beam S2 reflected by the optical disc 107 pass through the objective lens 106, reach the reflective mirror 105, are reflected by the reflective mirror 105 and are guided to the light collection lens 104.

The main beam M, the first sub beam S1 and the second sub beam S2 which have passed through the light collection lens 104 are reflected by the beam splitter 103, pass through the cylindrical lens 109 and the hologram device 110 sequentially and are detected by the light detector 111.

The light detector 111 will be described in detail.

Figure 4:
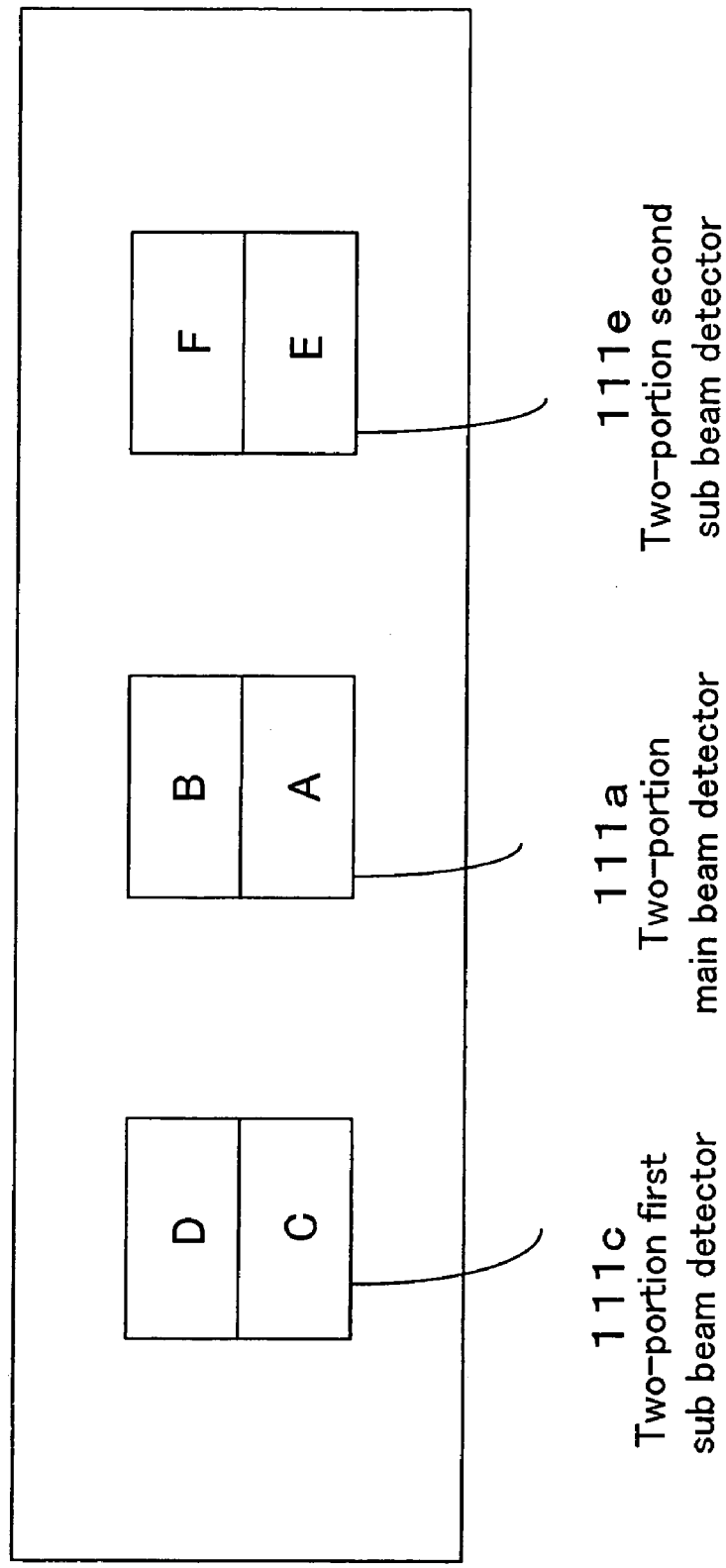
FIG. 4 is a block diagram illustrating a light detector in the optical head in the first example.

FIG. 4 is a block diagram illustrating the light detector 111.

The light detector 111 includes a two-portion main beam detector 111a, a two-portion first sub beam detector 111c, and a two-portion second sub beam detector 111e.

The two-portion main beam detector 111a, the two-portion first sub beam detector 111c and the two-portion second sub beam detector 111e are each divided into two portions in a radial direction of the optical disc 107.

In more detail, a surface of the two-portion main beam detector 111a includes a light receiving surface A and a light receiving surface B. The two-portion main beam detector 111a generates a differential signal which represents the difference between a light amount detected by the light receiving surface A and a light amount detected by the light receiving surface B.

A surface of the two-portion first sub beam detector 111c includes a light receiving surface C and a light receiving surface D. The two-portion first sub beam detector 111c generates a differential signal which represents the difference between a light amount detected by the light receiving surface C and a light amount detected by the light receiving-surface D.

A surface of the two-portion second sub beam detector 111e includes a light receiving surface E and a light receiving surface F. The two-portion second sub beam detector 111e generates a differential signal which represents the difference between a light amount detected by the light receiving surface E and a light amount detected by the light receiving surface F.

Returning to FIG. 1, the optical disc apparatus 10 will be described in more detail.

The optical head 100 outputs the differential signal generated by the two-portion main beam detector 111a, the differential signal generated by the two-portion first sub beam detector 111c, and the differential signal generated by the two-portion second sub beam detector 111e to the preamplifier 201.

The preamplifier 201 amplifies the differential signals generated by the two-portion main beam detector 111a, the two-portion first sub beam detector 111c and the two-portion second sub beam detector 111e. Then, the preamplifier 201 outputs the amplified differential signal generated by the two-portion main beam detector 111a to the main beam push-pull signal generation circuit 300, and outputs the amplified differential signal generated by the two-portion first sub beam detector 111c and the amplified differential signal generated by the two-portion second sub beam detector 111e to the sub beam push-pull signal generation circuit 301.

The main beam push-pull signal generation circuit 300 generates a main beam push-pull signal based on the differential signal generated by the two-portion main beam detector 111a.

The main beam push-pull signal generation circuit 300 includes a computation amplifier (not shown), which generates a main beam push-pull signal Mpp having the relationship represented by expression 1.

$$Mpp=(A-B) \tag{1}$$

where A represents the light amount detected by the light receiving surface A and B represents the light amount detected by the light receiving surface B.

The sub beam push-pull signal generation circuit 301 generates a sub beam push-pull signal based on at least one of the differential signal generated by the two-portion first sub beam detector 111c and the differential signal generated by the two-portion second sub beam detector 111e.

For example, the sub beam push-pull signal generation circuit 301 generates a sub beam push-pull signal by adding the differential signal generated by the two-portion first sub beam detector 111c and the differential signal generated by the two-portion second sub beam detector 111e.

The sub beam push-pull signal generation circuit 301 includes a computation amplifier (not shown), which generates a sub beam push-pull signal Spp having the relationship represented by expression 2. "Spp" refers both to a sub beam push-pull signal and an amplitude thereof.

$$Spp=(C+E)-(D+F) \tag{2}$$

where C represents the light amount detected by the light receiving surface C, D represents the light amount detected by the light receiving surface D, E represents the light amount detected by the light receiving surface E, and F represents the light amount detected by the light receiving surface F.

The displacement amount detection section 40 detects a displacement amount of the main beam push-pull signal Mpp from the reference value based on the main beam push-pull signal Mpp and the sub beam push-pull signal Spp.

The displacement amount detection section 40 may include an objective lens displacement amount detection circuit 305 for detecting a displacement amount of the objective lens 106.

The displacement amount detection section 40 includes a computation amplifier (not shown), which detects a displacement amount detection signal LS having the relationship represented by expression 3. The displacement amount detection signal LS represents a displacement amount of the main beam push-pull signal from the reference value. The displacement amount of the main beam push-pull signal from the reference value is a displacement amount associated with, for example, the displacement amount of the objective lens, the eccentricity of the objective lens, and the tilt of the optical disc 107.

$$LS=G \times (Mpp+\alpha \times Spp) \tag{3}$$

where G is, for example, 0.5. $\alpha$ is a constant determined by the ratio between the light amount of the main beam and the light amount of the sub beams.

$\alpha$ is set such that the value of Mpp and the value of $\alpha \times Spp$ are substantially equal to each other.

As described above, the main beam push-pull signal Mpp obtains a DC offset component when being displaced from the reference value. The displacement amount detection signal LS corresponds to the DC offset amount.

Similarly, the sub beam push-pull signal Spp obtains a DC offset component when the main beam push-pull signal Mpp is displaced from the reference value. The displacement amount detection signal LS also corresponds to the DC offset amount.

The tracking error signal generation section 50 generates a tracking error signal by correcting either the main beam push-pull signal Mpp and the sub beam push-pull signal Spp based on the displacement amount detected by the displacement amount detection section 40.

The tracking error signal generation section 50 may include a subtraction circuit 306 for subtracting the displacement amount signal LS from the main beam push-pull signal Mpp.

The tracking error signal generation section 50 includes a computation amplifier (not shown), which generates a tracking error signal TE having the relationship represented by expression 4 or 4'.

$$TE=Mpp-LS \quad (4)$$

$$TE=Spp-LS \quad (4')$$

As shown, the tracking error signal TE is a signal obtained by removing a DC offset component of the main beam push-pull signal Mpp or the sub beam push-pull signal Spp generated by the main beam push-pull signal Mpp being displaced from the reference value.

In expression 3, G=0.5. The value of G may be adjusted such that the DC offset component of the tracking error signal TE is zero when the displacement amount of the main beam push-pull signal from the reference value is changed in advance. In one embodiment of the present invention, the objective lens 106 may be displaced such that the DC offset component of the tracking error signal TE is zero when the objective lens 106 is displaced in advance. Such an arrangement allows the DC offset component caused by the main beam push-pull signal being displaced from the reference value, or caused by the objective lens 106 being displaced in the one embodiment, to be accurately removed even when the characteristics of the optical head are changed.

The tracking error signal TE generated by the tracking error signal generation section 50 is input to the driving section 60.

The driving section 60 may include a DSP (digital signal processor) 203.

The DSP 203 converts the tracking error signal TE into a digital signal. The DSP 203 further performs addition and/or multiplication of the digital signal by a built-in core processor so as to realize digital filter computation processing for phase compensation or gain compensation.

The DSP 203 again converts the digital signal, which has been computed in a prescribed manner, into an analog signal by a built-in D/A converter, and outputs the analog signal to the tracking driving circuit 204.

The tracking driving circuit 204 current-amplifies the analog signal to drive the objective lens actuator 308 as a tracking actuator in the optical head 100. The objective lens actuator 308 displaces the objective lens 106 in a direction substantially perpendicular to the tracks of the optical disc 107, and thus the main beam M moves along the tracks.

The displacement amount detection section 40 outputs the displacement amount detection signal LS to the DSP 203.

The DSP 203 converts the displacement amount detection signal LS into a digital signal. The DSP 203 performs addition and/or multiplication of the digital signal by a built-in core processor so as to realize digital filter computation processing for phase compensation or gain compensation.

The DSP 203 converts the signal obtained by a prescribed computation into an analog signal again by a built-in D/A converter, and outputs the analog signal to the transfer motor driving circuit 302.

The transfer motor driving circuit 302 current-amplifies the analog signal to drive a transfer motor 304. The transfer motor 304 transfers the objective lens actuator 308 in a direction substantially perpendicular to the tracks of the optical disc 107. Thus, the optical head 100 is controlled such that the displacement amount of the main beam push-pull signal from the reference value is zero.

Figure 5:
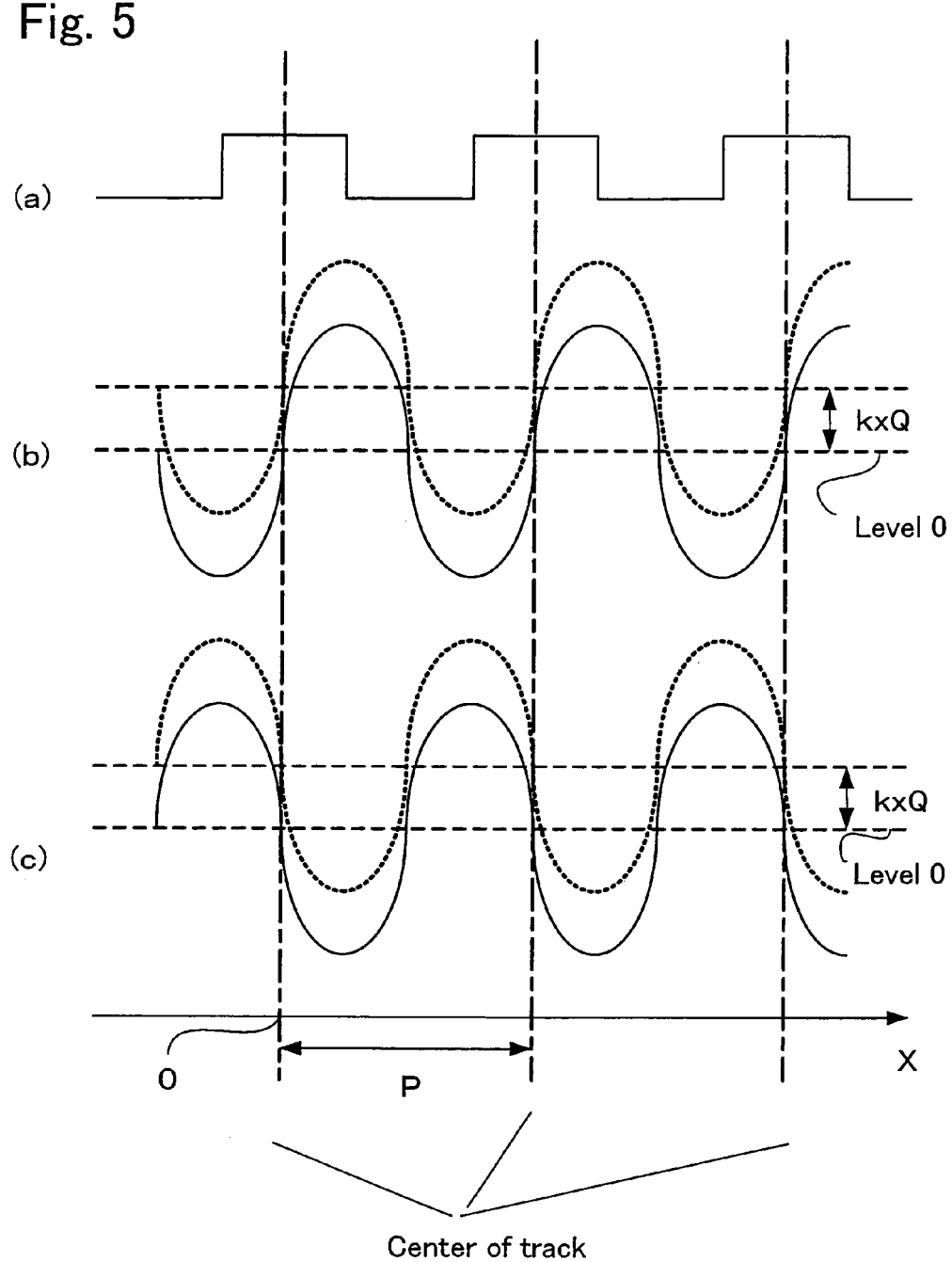
FIG. 5 is a waveform diagram for illustrating push-pull signals in the first example.

FIG. 5 is a waveform diagram for illustrating the main beam push-pull signal Mpp and the sub beam push-pull signal Spp in the first example.

FIG. 5 shows the main beam push-pull signal Mpp and the sub beam push-pull signal Spp when the main beam M, the first sub beam S1 and the first sub beam S2 cross a plurality of tracks.

Section (a) shows across-section of the optical disc 107.

Waveform (b) shows the main beam push-pull signal Mpp.

Waveform (c) shows the sub beam push-pull signal Spp.

In waveforms (b) and (c), the solid line represents the waveform where the main beam push-pull signal is not displaced from the reference value. The dotted line represents the waveform where the main beam push-pull signal is displaced from the reference value. The horizontal axis represents the relationship between the main beam M and the tracks. The vertical axis represents the levels of the main beam push-pull signal Mpp and the sub beam push-pull signal Spp.

In waveforms (b) and (c), the vertical one-dot chain lines represent the main beam M at the centers of the tracks. On the optical disc 107, the first sub beam S1 and the second sub beam S2 are directed to the positions which are deviated by ½ track pitch from the main beam M. Therefore, the main beam push-pull signal Mpp and the sub beam push-pull signal Spp are deviated in phase with respect to each other by 180 degrees.

In the case where the main beam push-pull signal is displaced from the reference value, the main beam push-pull signal Mpp and the sub beam push-pull signal Spp have the same polarity of DC offset components. The amounts of the DC offset components are in proportion to the displacement amount of the main beam push-pull signal Mpp from the reference value. Accordingly, the sine wave component is removed by adding the main beam push-pull signal Mpp and the sub beam push-pull signal Spp. Thus, the displacement amount detection signal LS corresponding to the displacement amount of the main beam push-pull signal from the reference value can be obtained.

This will be described using expressions.

The main beam push-pull signal Mpp is represented by expression 5.

$$Mpp=\sin(2\times\pi\times X/P)+k\times Q \quad (5)$$

Similarly, the sub beam push-pull signal Spp is represented by expression 6.

$$Spp=-\sin(2\times\pi\times X/P)+k\times Q \quad (6)$$

In expressions 5 and 6, X corresponds to the horizontal axis of FIG. 5, i.e., the position of the main beam M, and P represents the track pitch.

In expressions 5 and 6, it is assumed that the amplitudes of the main beam push-pull signal Mpp and the sub beam push-pull signal Spp are adjusted in advance so as to be equal to each other for the sake of simplicity. In expressions 5 and 6, Q represents the displacement amount of the main beam push-pull signal Mpp from the reference value, and k is a constant representing the DC offset component with respect to the displacement amount Q of the main beam push-pull signal Mpp from the reference value.

Accordingly, the displacement amount detection signal LS can be represented by expression 7 based on the relationship among expressions 3, 5 and 6.

$$LS=G\times 2\times K\times Q \quad (7)$$

When G=0.5, the displacement amount detection signal LS can be represented by expression 8.

$$LS = k \times Q \quad (8)$$

Accordingly, the tracking error signal TE can be represented by expression 9 based on the relationship among expressions 4, 5 and 8.

$$TE = \sin(2 \times \pi \times X/P) \quad (9)$$

The tracking error signal TE can also be represented by expression 9' based on the relationship among expressions 4', 6 and 8.

$$TE = -\sin(2 \times \pi \times X/P) \quad (9')$$

As shown in expression 9 or 9', the DC offset component of the main beam push-pull signal from the reference value is removed.

In the above description, the tracking error signal TE is generated by the subtraction circuit 306 in the tracking error signal generation section 50. The tracking error signal generation section 50 may include another computation circuit instead of the subtraction circuit 306. Hereinafter, an embodiment in which a computation circuit generates an objective lens displacement amount detection signal (also represented by the letters "LS") which shows an objective lens displacement amount will be described. The objective lens displacement amount is a displacement amount of the objective lens in the direction in which an optical beam crosses the tracks.

Figure 6:
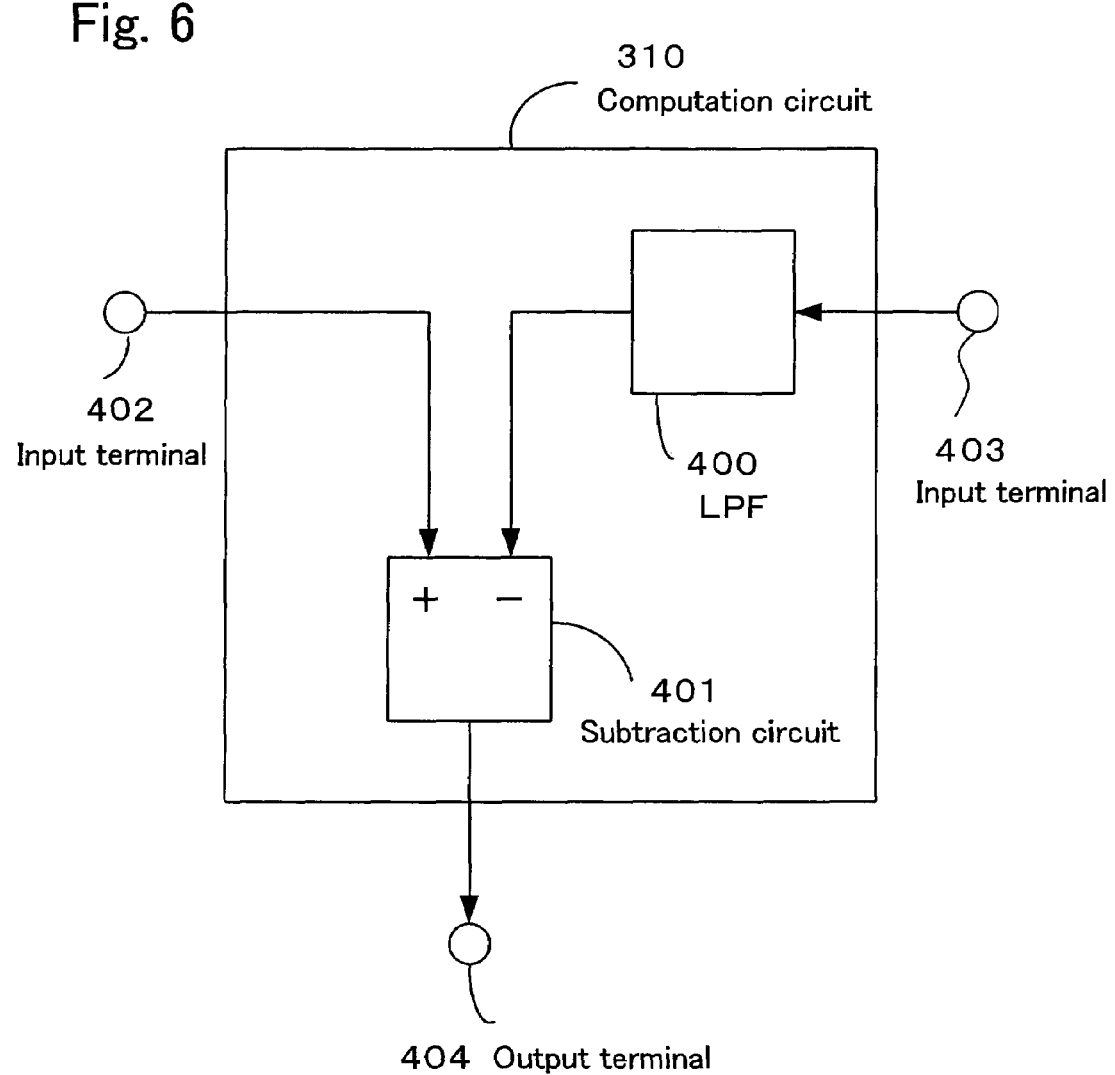
FIG. 6 is a block diagram illustrating a computation circuit in the first example.

FIG. 6 is a block diagram of a computation circuit 310 in the tracking error signal generation section 50 according to the first example of the present invention.

The computation circuit 310 includes a low pass filter (LPF) 400 and a subtraction circuit 401.

The low pass filter 400 is connected to an input terminal 403 for receiving an objective lens displacement amount detection signal LS. The low pass filter 400 extracts a low frequency component from the objective lens displacement amount detection signal LS, and outputs the low frequency component to the subtraction circuit 401.

The subtraction circuit 401 is connected to the input terminal 402 for receiving the main beam push-pull signal Mpp.

The subtraction circuit 401 subtracts the low frequency component of the objective lens displacement amount detection signal LS from the main beam push-pull signal Mpp, and outputs the subtraction result to the output terminal 404.

The output terminal 404 is connected to the DSP 203 in the driving circuit 60 (FIG. 1).

By including the low pass filter 400, the computation circuit 310 can remove the influence of a fluctuation component of the sub beam push-pull signal Spp, which is caused by a portion of the main beam M reflected by an information face which is different from the target information face being incident on the two-portion first sub beam detector 111c and the two-portion second sub beam detector 111e. As described above, such an undesirable phenomenon occurs due to, for example, a change in the distance between the information faces. Owing to the influence of the fluctuation component being removed, an accurate objective lens displacement amount detection signal LS can be generated.

In the above description, the sub beam push-pull signal generation circuit 301 generates the sub beam push-pull signal Spp based on both the differential signal generated by the two-portion first sub beam detector 111c and the differential signal generated by the two-portion second sub beam detector 111e. The present invention is not limited to this.

The sub beam push-pull signal generation circuit 301 may generate the sub beam push-pull signal Spp based on either the differential signal generated by the two-portion first sub beam detector 111a or the differential signal generated by the two-portion second sub beam detector 111e.

According to the first example, the tracking error signal TE is generated based on the displacement amount of the main beam push-pull signal Mpp from the reference value. Therefore, even when the main beam push-pull signal Mpp is displaced from the reference value, tracking control can be performed in the state where the offset component caused by the displacement amount of the main beam push-pull signal Mpp from the reference value is cancelled.

EXAMPLE 2

Figure 7:
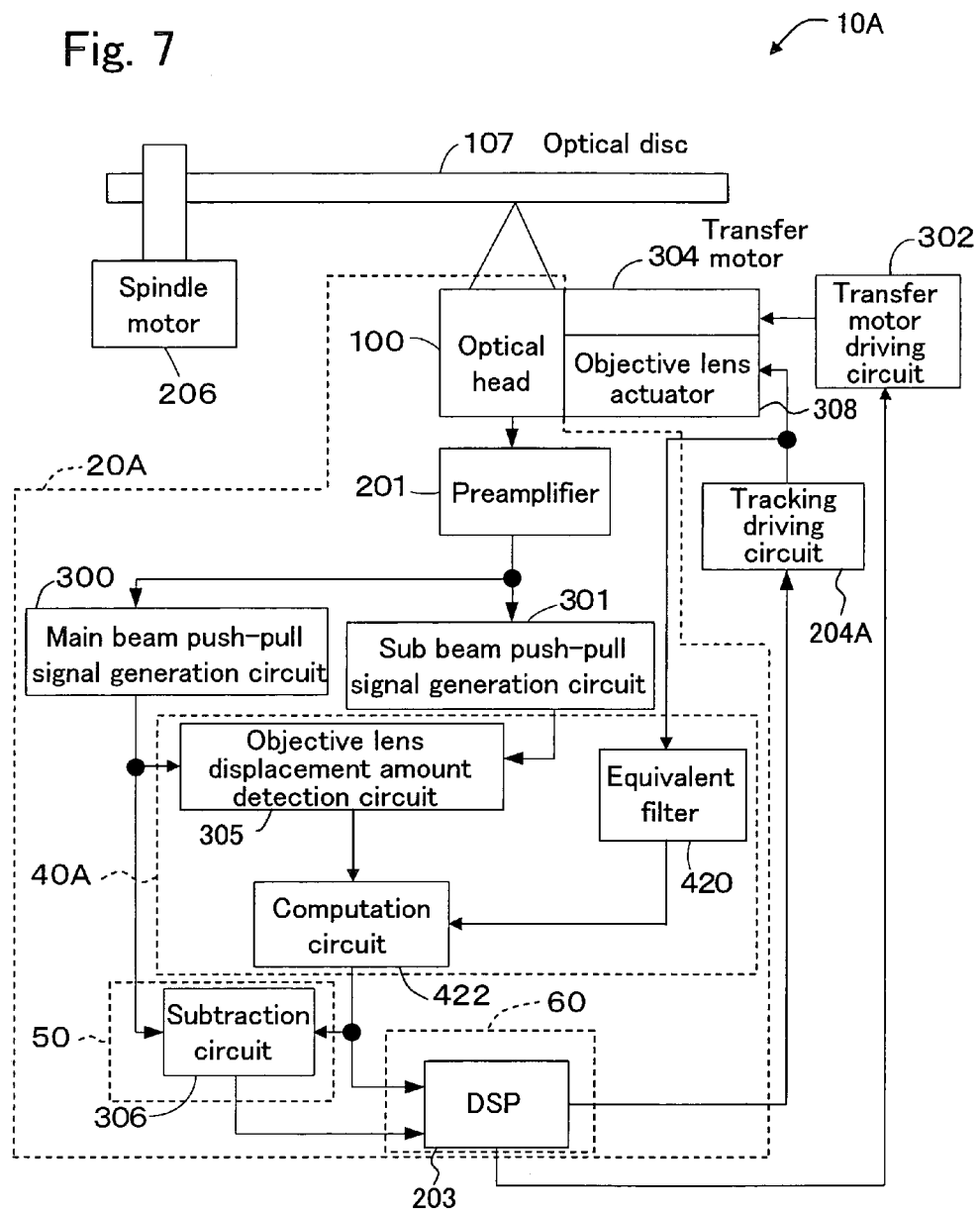
FIG. 7 is a block diagram illustrating an optical disc apparatus including a tracking error signal generation device according to a second example of the present invention.
Figure 10A:
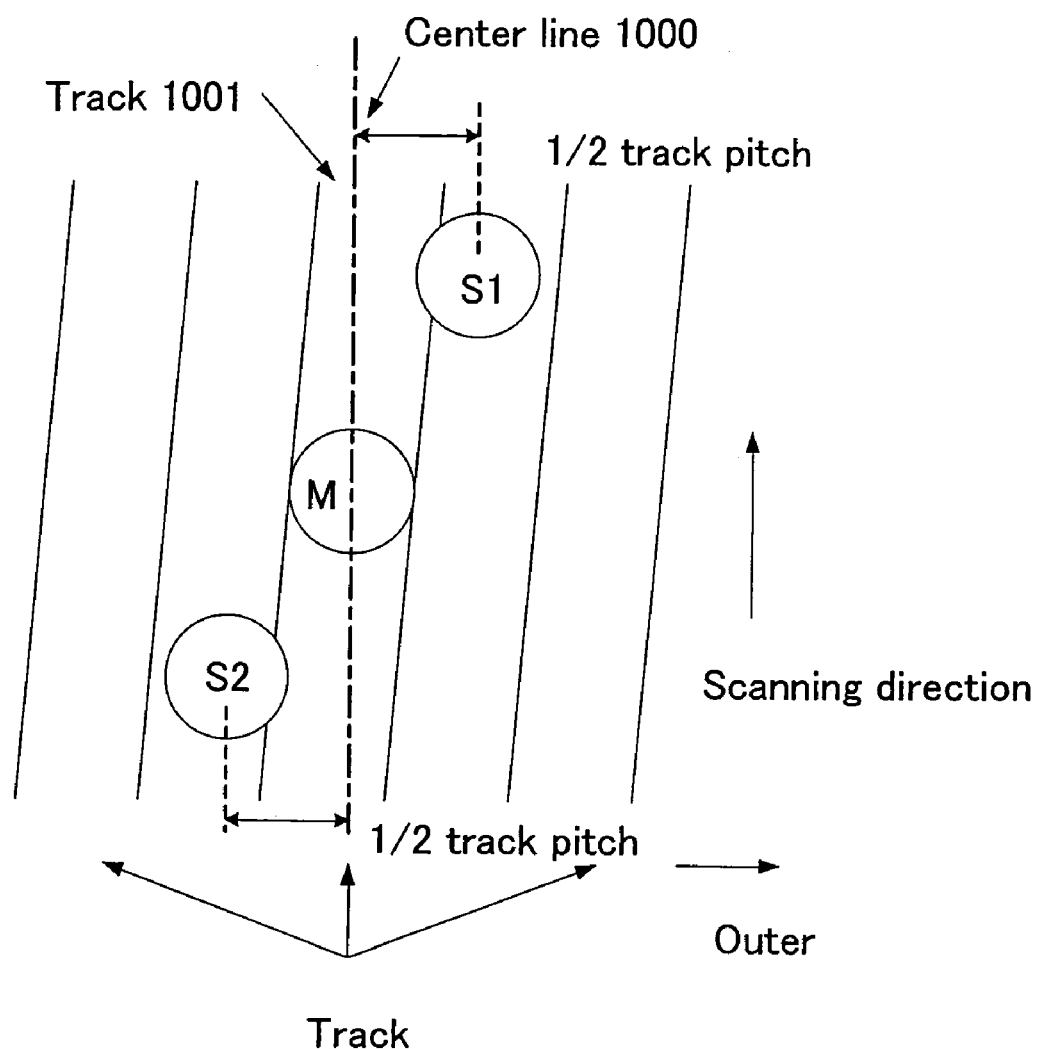
FIG. 10A is a schematic diagram showing the relationship between the tracks and the scanning direction of the main beam and the sub beams where the optical disc is rotated eccentrically in the conventional tracking error signal generation device.

FIG. 7 is a block diagram illustrating an optical disc apparatus 10A including a tracking error signal generation device 20A according to a second example of the present invention.

The elements in the optical disc apparatus 10A which are identical to the elements in the optical disc apparatus 10 described with reference to FIG. 1 in the first example bear identical reference numerals thereto, and the description thereof will be omitted to avoid redundancy.

In the second example, the case where the main beam push-pull signal Mpp is displaced from the reference value by the displacement of the objective lens 106 will be described in detail.

The elements in the tracking error signal generation device 20A which are identical to the elements in the optical disc apparatus 20 described with reference to FIG. 1 in the first example bear identical reference numerals thereto, and the description thereof will be omitted to avoid redundancy.

The tracking error signal generation device 20A includes a displacement amount detection section 40A. The displacement amount detection section 40A includes an objective lens displacement amount detection circuit 305, an equivalent filter 420, and a computation circuit 422. The equivalent filter 420 is a filter having a transfer function equal to that of the objective lens actuator 308.

A tracking driving circuit 204A outputs a signal, which is identical to or corresponds to the signal to be output to the objective lens actuator 308, to the equivalent filter 420.

The equivalent filter 420 generates a signal representing a displacement amount of the objective lens 106. This signal is represented as an objective lens displacement amount detection signal LS2.

The equivalent filter 420 outputs the objective lens displacement amount detection signal LS2 to the computation circuit 422.

The objective lens displacement amount detection circuit 305 outputs an objective lens displacement amount detection signal LS to the computation circuit 422.

The computation circuit 422 detects an objective lens displacement amount detection signal LS3 based on the objective lens displacement amount detection signal LS and the objective lens displacement amount detection signal LS2, and outputs the objective lens displacement amount detection signal LS3 to the subtraction circuit 306.

The subtraction circuit 306 generates a tracking error signal TE based on the objective lens displacement amount detection signal LS3 and the main beam push-pull signal Mpp. The tracking error signal TE is input to the DSP 203 in the driving circuit 60.

The operation of the optical disc apparatus 10A hereafter is the same as that of the optical disc apparatus 10 described above with reference to FIG. 1 in the first example.

The computation circuit 422 also outputs the objective lens displacement amount detection signal LS3 to the DSP 203. Based on the objective lens displacement amount detection signal LS3, the DSP 203 controls the transfer motor driving circuit 302 such that the transfer motor driving circuit 302 drives a transfer motor 304.

FIG. 8 is a block diagram of the computation circuit 422.

The computation circuit 422 includes a low pass filter (LPF) 601, a high pass filter (HPF) 602, and an addition circuit 604.

An input terminal 600 is connected to the objective lens displacement amount detection circuit 305. An input terminal 603 is connected to the equivalent filter 420.

The output terminal 605 is connected to the subtraction circuit 306.

The objective lens displacement amount detection signal LS which is input from the input terminal 600 has a low frequency component extracted therefrom by the low pass filter 601, and the low frequency component is input to the addition section 604.

The objective lens displacement amount detection signal LS2 which is input from the input terminal 603 has a high frequency component extracted therefrom by the high pass filter 602, and the high frequency component is input to the addition section 604.

The addition circuit 604 adds the low frequency component of the objective lens displacement amount detection signal LS and the high frequency component of the objective lens displacement amount detection signal LS2, and outputs the addition result to the output terminal 605 as the objective lens displacement amount detection signal LS3.

Using the low frequency component of the objective lens displacement amount detection signal LS, the influence of a fluctuation component of the sub beam push-pull signal Spp, which is caused by a portion of the main beam M reflected by an information face which is different from the target information face being incident on the two-portion first sub beam detector 111c and the two-portion second sub beam detector 111e, is removed. (As described above, such an undesirable phenomenon occurs due to, for example, a change in the distance between the information faces.) Thus, an accurate objective lens displacement amount detection signal LS3 can be generated. By using the high frequency component of the objective lens displacement amount detection signal LS2, an objective lens displacement amount detection signal LS3 which is accurate even in a high frequency range can be generated.

The transfer function of the equivalent filter 420 and the characteristics of the actual objective lens actuator 308 are easily varied especially in a low frequency range by a temperature change or the like. By using the objective lens displacement amount detection signal LS in a low frequency range, an objective lens displacement amount detection signal LS3 which is accurate in all frequency ranges, can be generated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tracking error signal generation device, comprising:
a splitting and convergence section for splitting an optical beam into a main beam and a sub beam and converging the main beam and the sub beam onto an optical disc;
a two-portion main beam detection section for detecting the main beam reflected by the optical disc;
a main beam push-pull signal generation section for generating a main beam push-pull signal based on a differential signal which is output from the two-portion main beam detection section;
a two-portion sub beam detection section for detecting the sub beam reflected by the optical disc;
a sub beam push-pull signal generation section for generating a sub beam push-pull signal based on a differential signal which is output from the two-portion sub beam detection section;
a displacement amount detection section for detecting a displacement amount of the main beam push-pull signal from a reference value based on the main beam push-pull signal and the sub beam push-pull signal; and
a tracking error signal generation section for generating a tracking error signal by correcting either the main beam push-pull signal or the sub beam push-pull signal based on the displacement amount detected by the displacement amount detection section,
wherein the displacement amount detection section adds the main beam push-pull signal and the sub beam push-pull signal and detects the addition result as a displacement amount of the main beam push-pull signal from the reference value, and
the tracking error signal generation section generates a tracking error signal by correcting the main beam push-pull signal based on a low frequency component of a signal representing the displacement amount detected by the displacement amount detection section.

* * * * *